(No Model.)  4 Sheets—Sheet 1.
J. SUTTON.
FILTER.

No. 470,338.  Patented Mar. 8, 1892.

Witnesses:
C. L. Sundgren
D. H. Hayward

Inventor:
John Sutton
by attorneys
Brown & Seward (No Model.) 4 Sheets—Sheet 2.

J. SUTTON.
FILTER.

No. 470,338. Patented Mar. 8, 1892.

Witnesses:
C. E. Sundgren
D. H. Hayward

Inventor:
John Sutton
by attorneys
Brown Seward (No Model.) 4 Sheets—Sheet 4.
J. SUTTON.
FILTER.

No. 470,338. Patented Mar. 8, 1892.

Witnesses:
C. Lundgren
D. H. Hayward

Inventor:
John Sutton
by attorneys
Brown & Seward

UNITED STATES PATENT OFFICE.

JOHN SUTTON, OF ISLIP, NEW YORK.

FILTER.

SPECIFICATION forming part of Letters Patent No. 470,338, dated March 8, 1892.

Application filed October 9, 1890. Serial No. 367,481. (No model.)

*To all whom it may concern:*

Be it known that I, JOHN SUTTON, of Islip, in the county of Suffolk and State of New York, have invented a new and useful Improvement in Apparatus for Filtering Beer and other Liquids, of which the following is a specification.

My invention relates to an improvement in apparatus for filtering beer and other liquids in which the liquid to be filtered is conducted under vat-pressure to a point above the vat, and is conducted thence to the filter or filters, located in any desired position on a level with or above the vat, and thence to the barrels or other receptacles in which the filtered liquid is to be stored.

A practical embodiment of my invention is represented in the accompanying drawings, in which—

Figure 1:
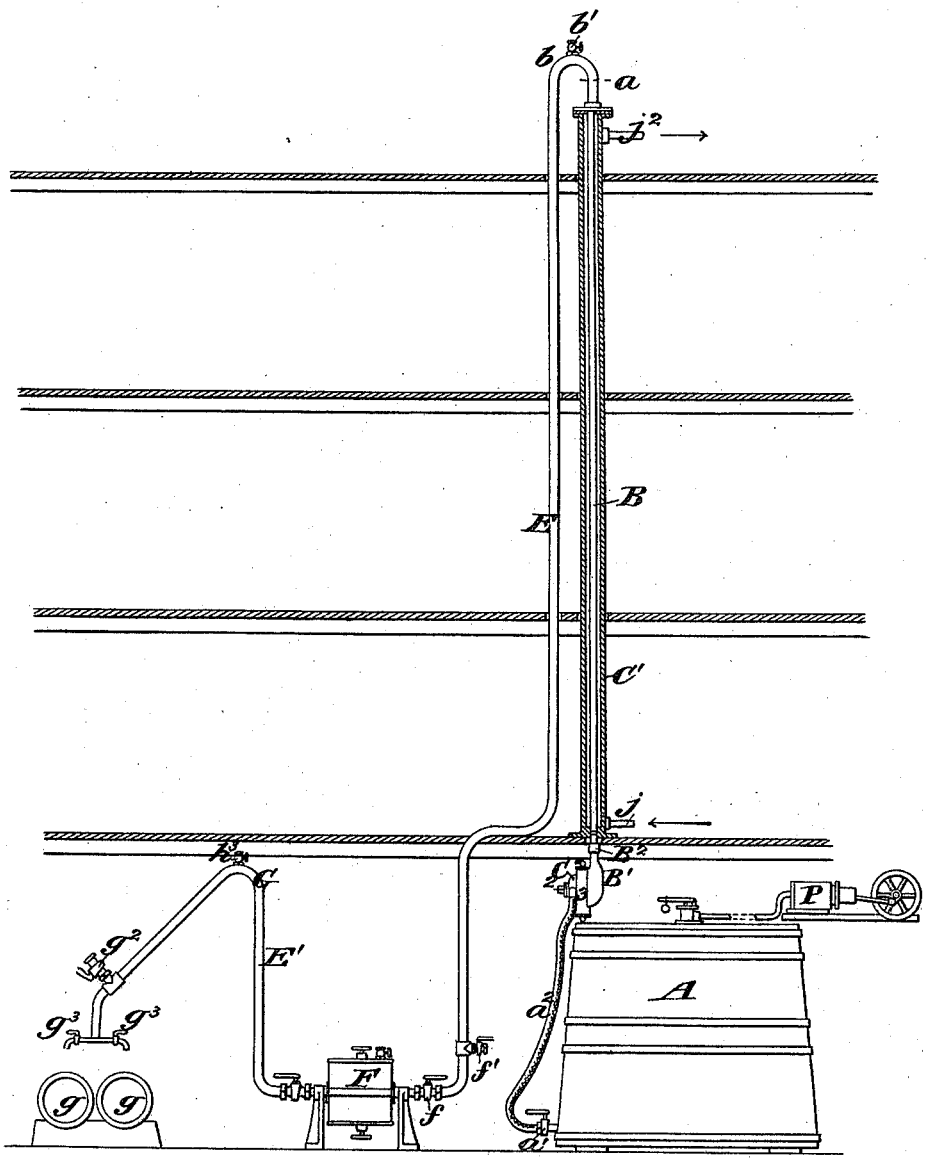
Figure 2:
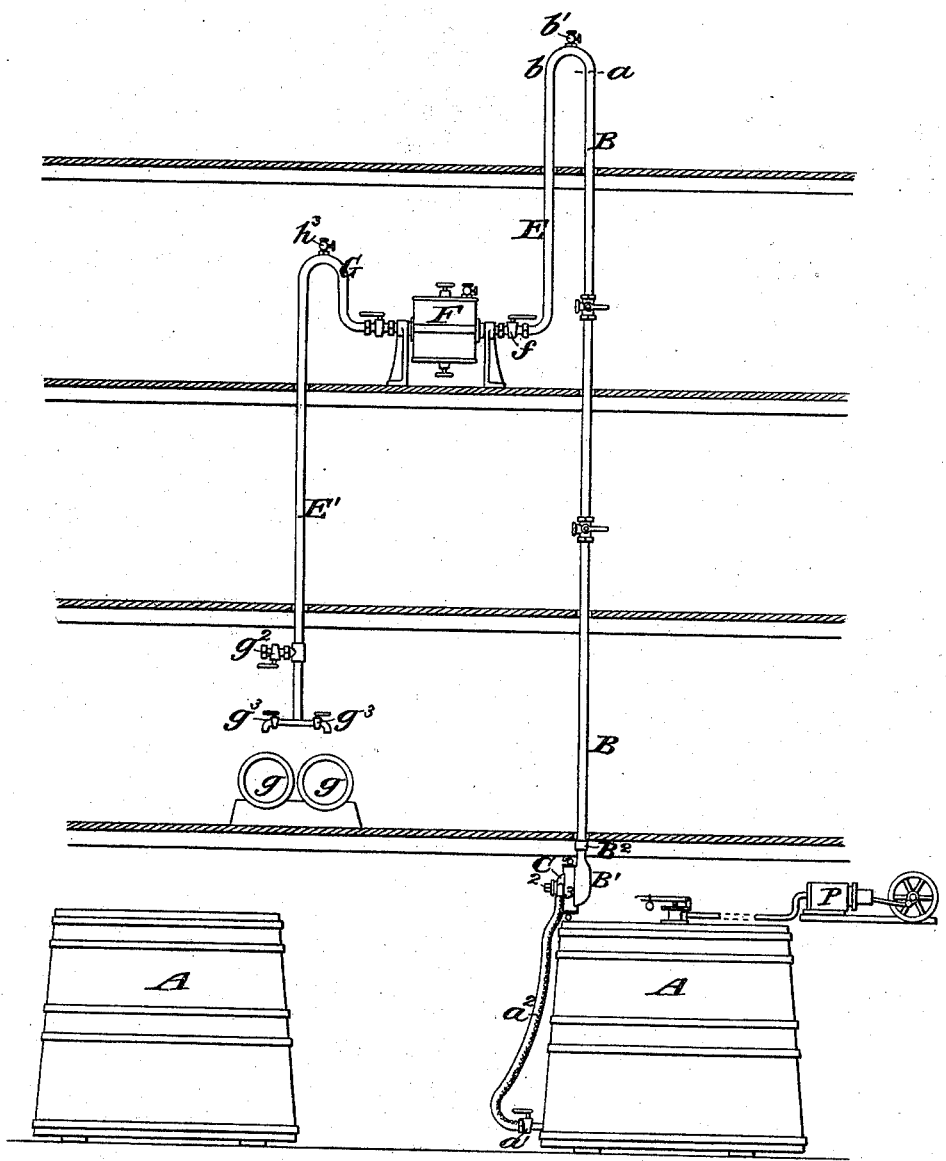
Figure 3:
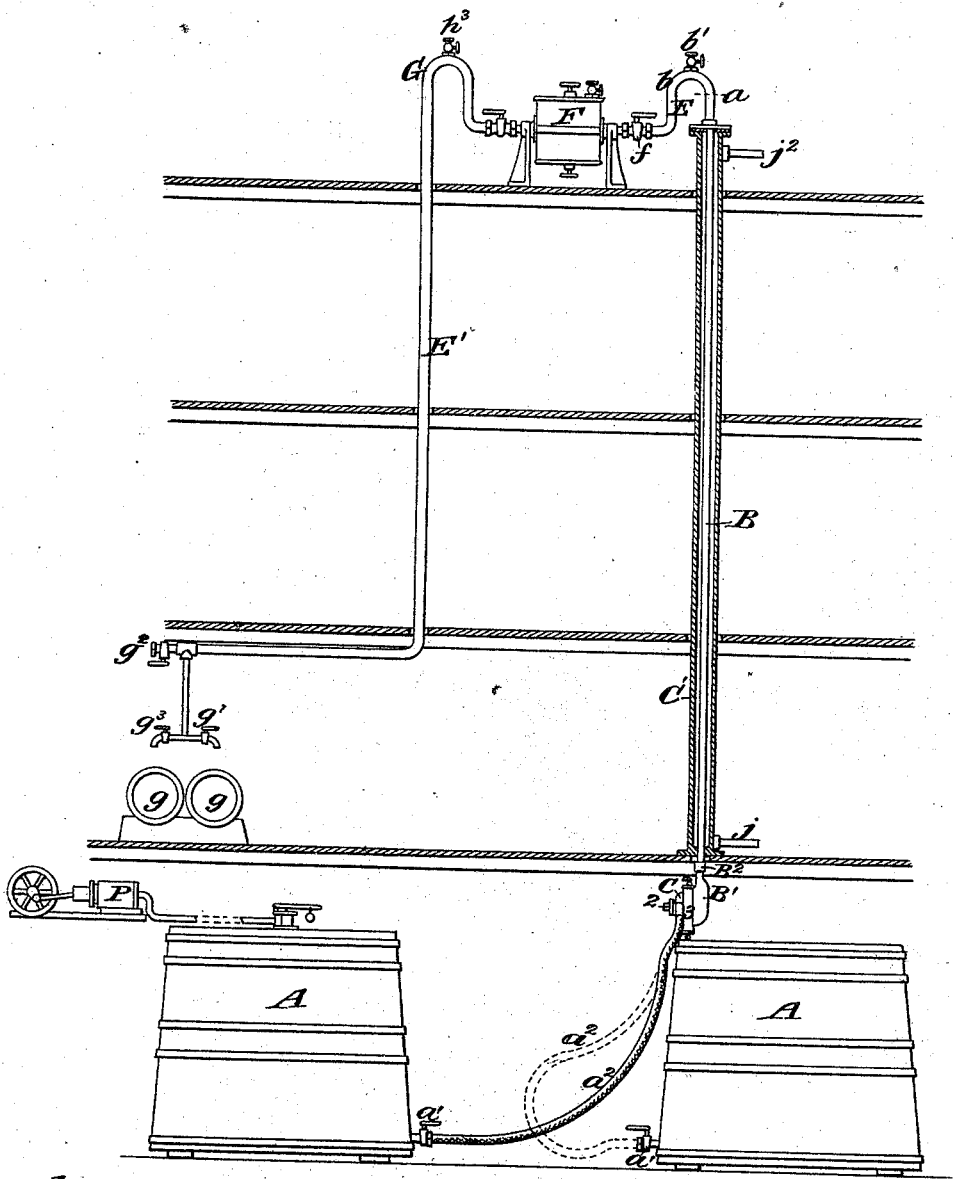
Figure 4:
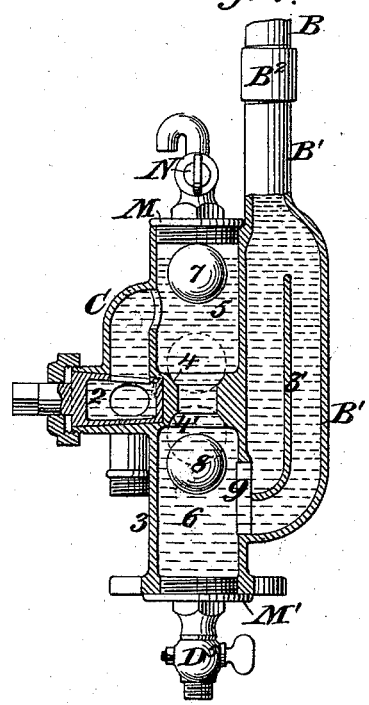
Figure 6:
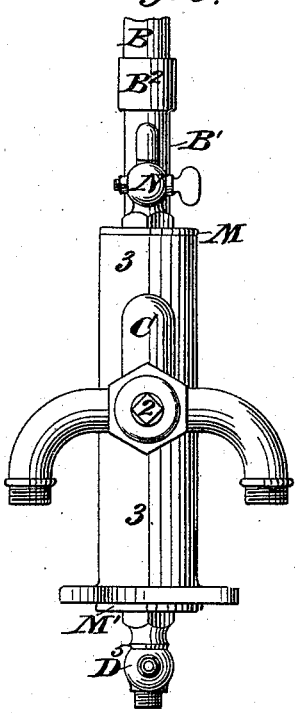
Figure 5:
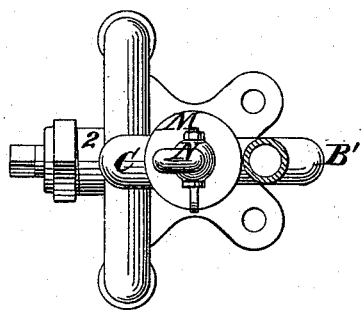

Figure 1 represents the apparatus with filter located substantially upon a level with the vat. Fig. 2 is a similar view showing the filter upon a higher level than the vat, and provided with means for exerting a suction upon the outlet side of the filter. Fig. 3 is a similar view showing the filter upon a still higher level, and means for exerting a still greater suction upon the outlet side of the filter; and Figs. 4, 5, and 6 are enlarged views of parts in detail.

A represents the vat, and B a stand-pipe into and up which the liquid to be filtered is forced from the vat by pressure exerted upon the surface of the liquid in the vat A. The pressure may be exerted by an ordinary force-pump (denoted at P in the drawings) adapted to force air or any gas, as may be desired, into the vat. The vat-pressure may be sufficient to raise the liquid to the line $a$, Fig. 1, only, from whence the liquid will be siphoned off to the filter, or it may be sufficient to force it throughout the length of the pipe B and to its entrance to the filter. The pipe B is here represented as standing upright, and the liquid is conducted from its upper end to the filter. It may, however, be in other shape than straight and upright, and the liquid may be led to the filter from a point below its upper end. The liquid is here shown as delivered from the lower part of the vat through a cock $a'$ into a pipe $a^2$, (shown as a piece of flexible hose connected near one of its ends to the cock $a'$.) I prefer to use this flexible hose, so that connection may be made with any of the different vats of a series, as shown more clearly in Fig. 3. The upper end of the hose from the vat A is coupled to any suitable kind of cock 2 (here shown as a three-way cock) for the purpose of admitting liquid, air, and gas to the trap chambers or vessel 3. They may admit the liquid from one or more vats at the same time, and one or more of them may be shut off from the trap or vat, or may be opened to it and without stopping the operation, thus permitting another tank or vat to be coupled, ready for the liquid to flow to the stand-pipe B by turning the cock to suit. This trap forms a sediment-vessel and may be of any suitable form and size, (transparent or not,) and may be provided at pleasure with a division-wall 3', of any suitable height, for separating the ascending liquid from the descending impurities. It is desirable that the combined trap and sediment-vessel be somewhat larger in diameter than the column B. Within the trap-shell, about midway of its length, is a division having a circular passage through it, centrally placed, its ends forming an upper and lower seat 4 4' for the upper and lower floating-ball valves acting directly over each other. The floating ball 7, when the liquid ceases to flow and the air and gases enter instead, will descend and center and fit tightly to its seat when the liquid-surface is pressed upon and lowered by the incoming pressure of air and carbonic acid or other gas into the chamber 5, (see dotted ball,) and will thus prevent the air and gases passing from the vat to the lower chamber 6 and to the column B. The floating ball 8 in the lower chamber is to prevent a back flow of liquid from the column through the chamber and valve-passage to the vat. (See dotted ball seated.) The usual check-valve may be used there or elsewhere where required instead of the balls. The positions of the balls are indicated while the current of liquid is passing from the vat or vats to the column. The ball-valves have the advantage of not choking, while they are self-acting and prevent the air and gases entering the column and filtering apparatus and prevent the return of liquid from the column should intermittent pressure occur or the operation be stopped. In such event the ball 8 would be pressed to its seat by the weight of liquid in the pipe or column B. The liquid-conducting pipe B' may be cast or made integral with the trap-shell 3 and is connected to the column B by a suitable coupling B², its bottom end opening within the chamber 6, where it may be enlarged and grated, if required, to prevent the ball 8 from reducing the area of the outlet 9 to the column or pipe B.

C is the liquid and air and gas inlet or conduit from the cock 2 to the chamber 5. The bottom of chamber 6, which may be of suitable size and shape, collects any descending sediment coming from the vats, trap, or column, which matter may be led off, as occasion may require, by the blow and cleansing cock D⁵, which also serves for flushing as well as for emptying the column or trap 3. This provision for gravitating and removing the impurities from the liquid before it is led to the filter is a matter of great importance, as it serves to relieve the filter in a great measure from clogging material.

M M' are removable covers to admit the balls to their chambers.

N is a vent for leading off air and gases when so required.

In operation the cocks $a'$ and 2 being opened and pressure applied to the surface of the liquid in the vat A, the liquid will be forced therefrom upwardly into and through the trap 3 and into the pipe B, from which it may be siphoned off through one or more return-bends $b$, which may be transparent or not, or the pressure may be sufficiently great to force it through the pipe B to the entrance to the filter. For the purpose of keeping the pressure within the vat uniform, I provide either the vat or the pump with a suitable safety-valve, which may be adjusted to secure the desired pressure.

E represents that portion of the conducting-pipe which communicates at one end with the inlet side of the filter and at its opposite end with the column or pipe B, and E' represents that portion of the conducting-pipe which communicates at one end with the outlet side of the filter and at its opposite end with the apparatus for delivering the liquid into the storage-receptacles. In the present example of my invention I have shown the pipe E connected with the upper end of the pipe or column B by a return-bend $b$, and the latter is provided with a suitable vent $b'$. In the pipe E is a cock $f$, and in connection therewith there may be a sediment-trap, if desired. Near the cock $f$ and arranged in the pipe E so as to communicate with the latter is a coupling or flushing-cock $f'$. Any well-known or approved means may be provided for relieving the filter and pipes where required of pent up gases and foam. In Fig. 1 I have shown the pipe E' leading from the outlet of the filter extended upwardly from the filter and arranged to discharge the filtered liquid into the storage-receptacles $g$ at a point above the filter. The return-bend, where the pipe E' changes from an upward direction to a downward one, is denoted by G. The pipe E' may be carried laterally or upwardly to any required distance in order to exert any desired back-pressure upon outlet side of the filter and also to determine the pressure or velocity with which the liquid shall be discharged into the storage-receptacles at the different heights. The liquid will be backed up against the outlet end of the filter whenever the discharge is above the end of the filter, and the amount of back-pressure upon that side of the filter will depend upon the height of the discharge above the filter. The discharge end of the pipe E' is provided with branches having suitable cocks $g^3$, and said discharge-pipe is also provided with a vent $h^3$ and a flushing-cock $g^2$. The liquid is discharged into the storage-receptacles $g$ by manipulating the cocks $g^3$.

When the liquid is held in the pipe or column B under a pressure which is not sufficient to force it through the return-bend $b$, the apparatus may be started by manipulating the cock $f$ and vent $b'$, so as to fill the pipe E with water and also the return-bend $b$. The vent $b'$ may then be closed and the liquid will start to flow from the pipe or column B by siphoning action. When the water has escaped through the cock $f$ and the liquid to be filtered appears, the cock may be closed and the liquid will then be caused to travel through the filter F. When the vat-pressure is sufficient to force the liquid to be filtered directly to the inlet side of the filter, there will of course be no need of the above-described steps in starting.

In the examples of my improvement illustrated in Figs. 2 and 3 provision is made for exerting a greater pull on the outlet side of the filter by the column of liquid in the pipe E' and a lesser pressure upon the inlet side by decreasing the length of the column in the pipe E In all examples of my invention the liquid is raised by pressure in the vat A, up the column B, and is thence led either by siphoning or pressure to the filter or filters, and this provision for elevating the liquid in a column above the vat by pressure upon the liquid in the vat before transferring it to the filters is a very prominent feature of my improved apparatus, for reasons which will appear in the following paragraph.

Around the uprising column or pipe B and spaced therefrom I locate a tube C'. The space between the exterior of the pipe B and the interior of the tube C' forms a heating or cooling chamber through which any suitable refrigerating or heating medium may be passed for the purpose of chilling and condensing the liquids, gases, and foam, or for thinning liquids which may be too dense for purposes of rapid and effective filtering. An inlet-pipe $j$ and an exit-pipe $j^2$ are shown for purposes of keeping up a circulation of the heating or cooling medium about the pipe B. Means for heating or cooling the liquid may also be applied to the pipes E E', if desired. The uprising column or pipe B may be of sufficient size to supply pipes leading therefrom to several filters instead of one, and the structure is such that the warming and cooling may be accomplished in a very convenient and economical way, while at the same time the liquid may be freed to a great extent of its sediment before being led to the filters. It also provides for introducing the liquid to the filter under its own weight exerted upon the inlet or upon the outlet side, or upon both, and does away with the necessity of using an exhaust mechanism—such, for example, as an exhaust-pump—to draw the liquid through the filter, and thereby prevents the loss of such gases as it is desirable should be retained therein. It also provides a simple and ready means for discharging the filtered liquid upon floors above the vat, where plenty of light and pure air may be had.

What I claim as my invention, and desire to secure by Letters Patent, is—

1. In filtering apparatus, the combination, with a vat and a filter, of a pipe or column extending upwardly from the vat and communicating with the filter, a sediment-chamber at the base of the pipe or column, and means for maintaining pressure within the vat to force the liquid to be filtered up the said pipe or column, substantially as set forth.

2. In filtering apparatus, the combination, with a vat and a filter, of a pipe or column extending upwardly from the vat and communicating with the filter, a chamber surrounding the uprising pipe or column for cooling or heating, a sediment-chamber at the base of the column, and means for maintaining pressure in the vat to force the liquid to be filtered up the pipe or column, substantially as set forth.

3. In filtering apparatus, the combination, with the vat and filter, of an uprising pipe or column leading from the vat and communicating with the filter, a sediment-chamber at the base of the column and a partition within the column in proximity to the sediment-chamber for separating the upward flow of the liquid from the vat and the downward passage of the sediment, substantially as set forth.

4. In filtering apparatus, the combination, with the vat and filter, of the uprising column leading from the vat and communicating with the filter and the sediment-chamber at the base of the column, the said sediment-chamber having a valve-opening in its top for the admission of the liquid from the vat, an opening to the uprising column at its side, and a blow-off cock at its lower end, substantially as set forth.

JOHN SUTTON.

Witnesses:
  FREDK. HAYNES,
  GEORGE BARRY.